Oct. 31, 1961  L. S. HATCH  3,006,398
BUCKLE APPLYING MACHINE FOR BALE TIES OR STRAPS
Filed Oct. 11, 1957  5 Sheets—Sheet 1

INVENTOR
LEWIS S. HATCH

BY *Cushman Darby & Cushman*
ATTORNEYS

Oct. 31, 1961  L. S. HATCH  3,006,398
BUCKLE APPLYING MACHINE FOR BALE TIES OR STRAPS
Filed Oct. 11, 1957  5 Sheets-Sheet 2

INVENTOR
LEWIS S. HATCH

BY *Cushman Darby Hendon*
ATTORNEYS

Oct. 31, 1961     L. S. HATCH     3,006,398
BUCKLE APPLYING MACHINE FOR BALE TIES OR STRAPS
Filed Oct. 11, 1957     5 Sheets-Sheet 3

INVENTOR
LEWIS S. HATCH
BY
ATTORNEYS

Oct. 31, 1961 L. S. HATCH 3,006,398
BUCKLE APPLYING MACHINE FOR BALE TIES OR STRAPS
Filed Oct. 11, 1957 5 Sheets-Sheet 4

INVENTOR
LEWIS S. HATCH

BY *Cushman Darby Cushman*
ATTORNEYS

Oct. 31, 1961 L. S. HATCH 3,006,398
BUCKLE APPLYING MACHINE FOR BALE TIES OR STRAPS
Filed Oct. 11, 1957 5 Sheets-Sheet 5
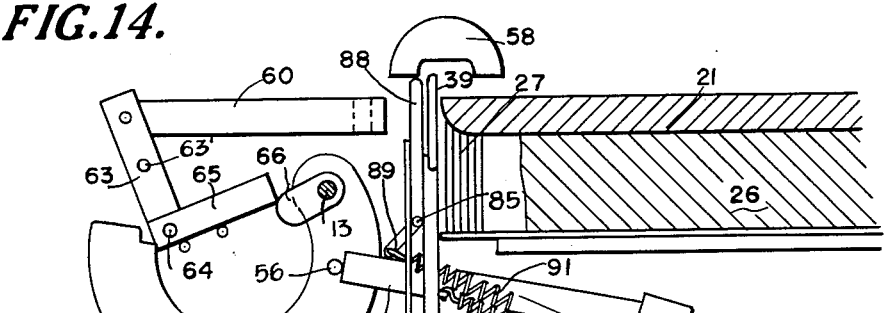
FIG.14.
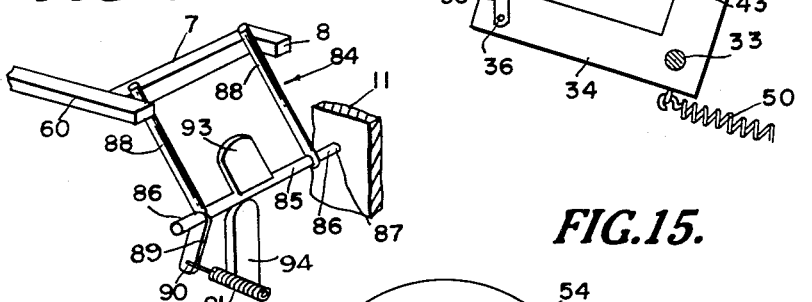
FIG.16.
FIG.15.
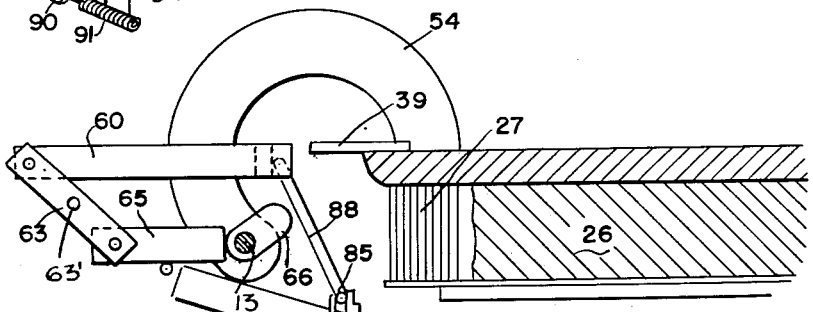
FIG.13.
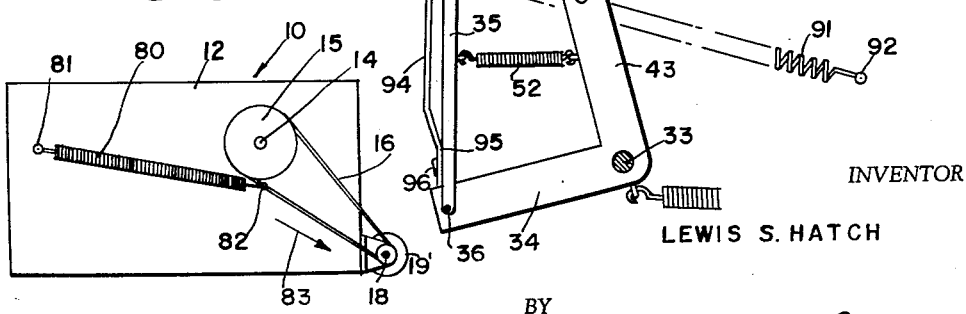
INVENTOR
LEWIS S. HATCH
BY
*Cushman Darby & Cushman*
ATTORNEYS United States Patent Office 3,006,398
Patented Oct. 31, 1961

3,006,398
BUCKLE APPLYING MACHINE FOR
BALE TIES OR STRAPS
Lewis S. Hatch, Rte. 2, P.O. Box 202, San Benito, Tex.
Filed Oct. 11, 1957, Ser. No. 689,712
4 Claims. (Cl. 153—1)

The present invention relates to a buckle applying machine for connecting a buckle to a metal tie or strap that is to be wrapped around a cotton bale or the like.

An important object is to provide a simple, efficient, and economical automatically operable tie or strap folding machine having means for moving and maintaining an eyelet buckle in position so that a free end portion of the strap may be passed through the eyelet and the end portion of the strap bent in overlapping relation to the main portion of the strap, so as to firmly and securely connect the buckle to the strap. When this clamping operation is completed, ejecting means are provided for clearing the band and the buckle connected thereto to a position which will not interfere with the movement of the next buckle so that it can be manually removed from the machine. Also, means are provided for automatically feeding a new buckle so as to be connected to the next tie without interfering with the operation of the machine.

A further object consists in associating with the folding machine, a rock shaft to which is fixed a clamping or securing member preferably in the form of a curved or segmentally shaped hammer that is arranged to be moved to engage the free end portion of the strap and clamp the same against the body of the strap after the strap has been inserted through the eye of a buckle or the like. The rock shaft is preferably operatively connected to a reversing motor so as alternately to cause the shaft to be moved from an inoperative position to an operative position, and then be returned to its inoperative position. Additionally, means are provided which are operatively connected to the oscillating shaft for singly feeding the buckles from a supply receptacle or drawer to a position so as to register with the eyelet or opening in the buckle in order that the strap may be passed through the buckle in order to be firmly connected thereto when the end portion of the strap is moved by the hammer into overlapping engagement with the main portion of the strap.

A still further object is to operatively connect the rocking shaft to an ejecting member for removing the strap and the buckle secured thereto by the hammer from the machine. Also, means operable by rotation of the rock shaft are provided for singly feeding from a suitable receptacle or drawer a buckle having an eyelet or opening, to a position, so that a suitable flexible tie or strap may be passed therethrough and then folded over upon itself so as to firmly and positively secure the buckle to the strap and at a minimum expenditure of time, effort, and cost.

Other objects and advantages of the invention will become apparent from the following description, when taken in conjunction with the accompanying claims and drawings.

Referring to the drawings:

FIGURE 13 is a side view of a modified form of strap-folding machine constructed in accordance with the present invention;

FIGURE 14 is a view similar to FIGURE 3 showing a modified form of the invention provided with a buckle guide connected to the bell crank and showing the hammer in its lower inoperative position;

FIGURE 15 is a view similar to FIGURE 14 but showing the hammer and its associated parts in their operative position; and FIGURE 16 is a detailed perspective view of the buckle guide shown in FIGURES 14 and 15.

Figure 1:
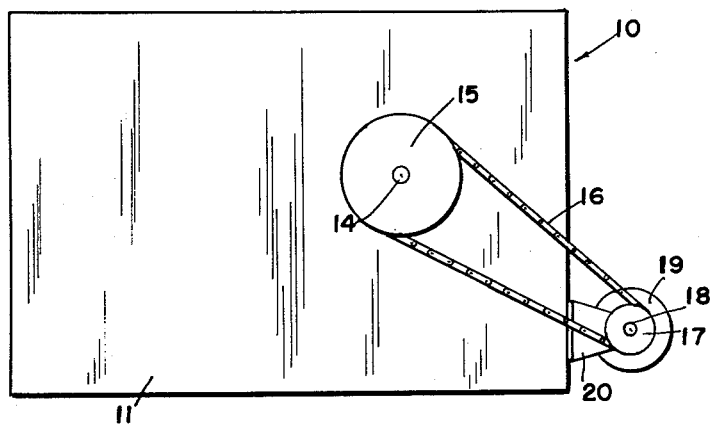
FIGURE 1 is a side view of a tie or strap folding machine constructed in accordance with the present invention.
Figure 2:
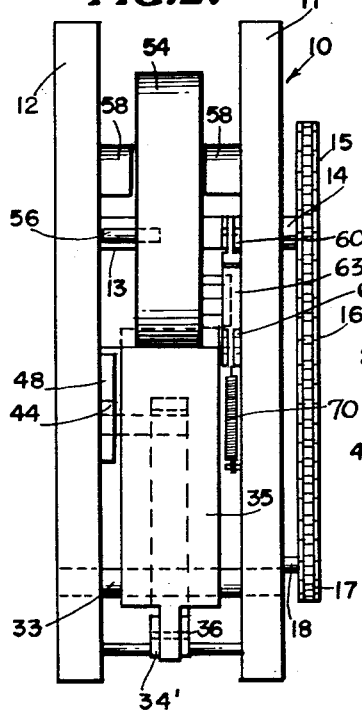
FIGURE 2 is an end view of FIGURE 1.
Figure 6:
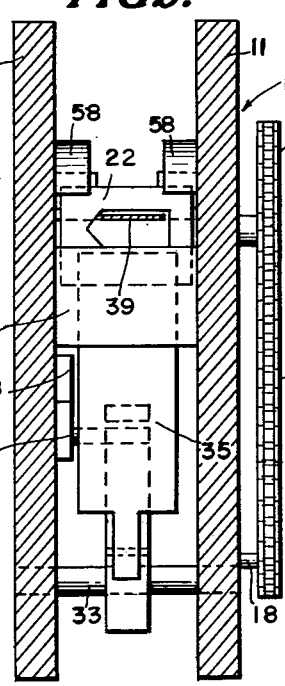
FIGURE 6 is a sectional view taken substantially along the line 6—6 of FIGURE 4.
Figure 9:
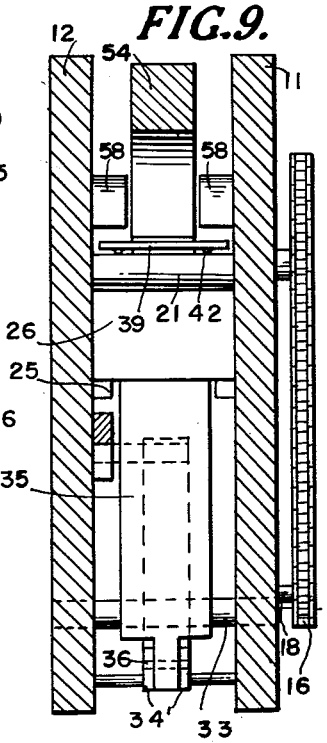
FIGURE 9 is a sectional view taken substantially along the line 9—9 of FIGURE 7.

Referring to the drawing, 10 indicates a tie or strap folding machine constructed in accordance with the present invention, and which preferably includes a pair of spaced vertically disposed side walls or plates 11 and 12 (FIG. 2). Extending transversely through the walls 11 and 12 is a rocker shaft 13 that projects beyond the outer side of the wall 11 at as 14 (FIG. 2) and may be keyed or otherwise non-rotatably secured to a sprocket wheel 15 (FIG. 1) around which passes an endless link chain 16 that also engages a sprocket wheel 17 carried by an oscillating drive shaft 18 of the reversible motor 19 that may be connected to one end of the machine 10 by the brackets 20. Manifestly, the shaft 13 may be rotated by other suitable drive means such as an endless belt and pulley assembly, operatively connected to a suitable prime mover or the like.

Figure 3:
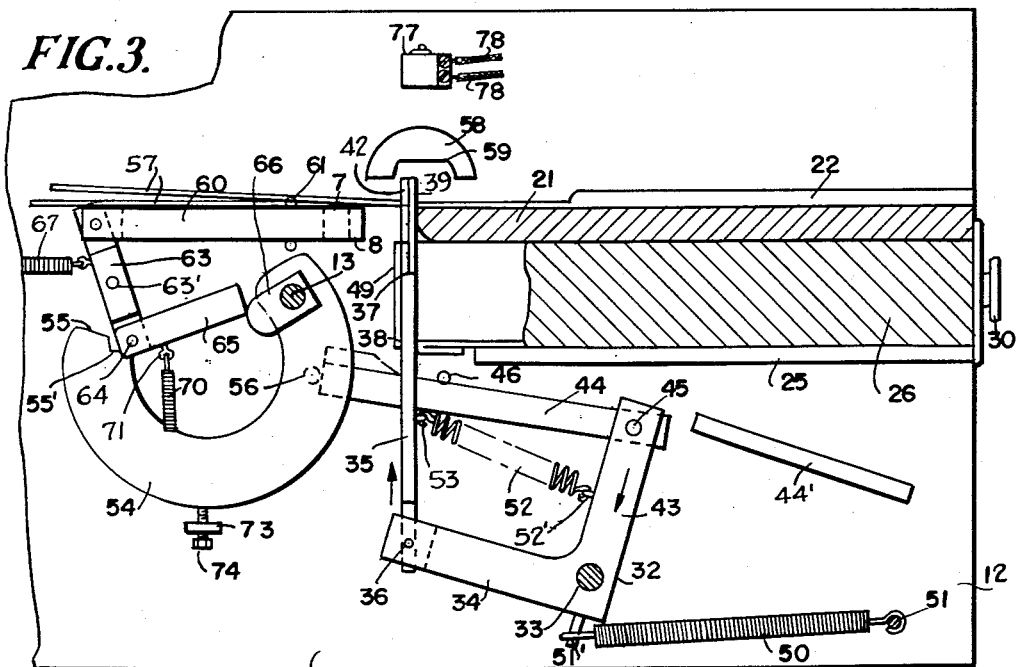
FIGURE 3 is a vertical sectional view showing an inside wall of the machine and the parts connected thereto with the hammer in its lowermost or inoperative position.
Figure 4:
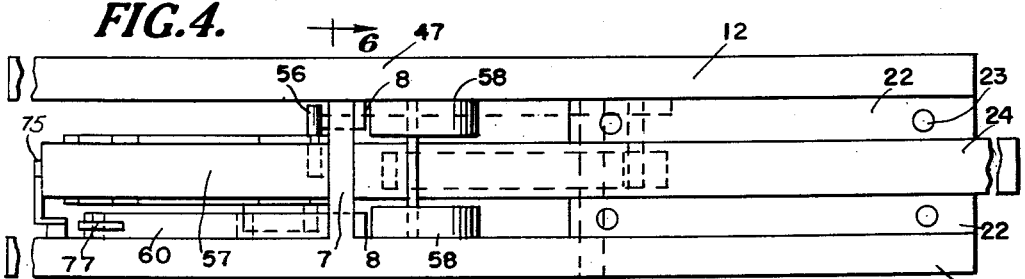
FIGURE 4 is a detailed plan view of FIGURE 1, showing a tie or a strap inserted in the machine and prior to folding the same.

The vertically spaced walls 11 and 12 have positioned between them and adjacent the top of the machine, a longitudinally extending anvil or supporting member 21 which extends inwardly from the end of the machine to a distance short of the opposite end (FIG. 3). The top of the anvil is provided with longitudinally spaced guide ribs 22 suitably secured thereto, such as by the screws or bolts 23 (FIG. 4) and of such a width as to receive between them the flexible metal tie, strap, or band 24. Beneath the anvil 21 and vertically spaced therefrom are a pair of longitudinally extending ribs 25 suitably secured to the confronting inner sides of the walls 11 and 12, respectively, so as to constitute spaced supports for slidably receiving an elongated drawer or receptacle 26 (FIG. 5) in which are longitudinally positioned metal tie buckles or the like 27. A plate 28 is longitudinally slidable in the drawer 26 so as to be connected to an operating handle 30. A tension spring 31 surrounds the rod 29 and is confined between the plate 28 and the end of the drawer 26, so as to provide yieldable means for normally urging the buckles inwardly. A loading member preferably in the form of a bell crank 32 is rotatably mounted on a transverse shaft 33 that extends between the vertical spaced walls 11 and 12 of the machine. The bell crank has a laterally extending arm 34 (FIG. 7) that may be formed with a bifurcated end 34' (FIG. 2) to which is pivotally connected the reduced lower end of a vertically disposed buckle feeding arm 35 as at 36. The upper end portion of the arm 35 is provided with a cut-out shoulder portion or seat 37 of sufficient width as to support a buckle or link 27. The arm 35 extends upwardly a limited distance into the drawer 26 through an opening 38 in the bottom of the drawer 26, and is of such a length and width as to project a buckle above the anvil 21. When the arm 34 of the bell crank 32 is in its lowermost position (FIG. 7) it will move the feeder arm 35 downwardly so that the shoulder portion 37 thereof is positioned beneath the innermost buckle 39, so that, when the rod 35 is raised vertically, it will engage the bottom of the buckle 39 and elevate the same to the position shown in FIGURE 3. The buckles 27 are made of any suitable material preferably metal and each has a transverse eyelet or opening 40 (FIG. 11) which may communicate with a vertical opening 41. One side of the buckle 27 is preferably also formed with transverse spaced guide ribs 42 disposed on opposite sides of the opening 41 that sequentially engage the inner wall 49 of the drawer 26 (FIG. 5) so as to maintain each buckle in proper position as it is being raised to its position above the anvil 21.

Figure 7:
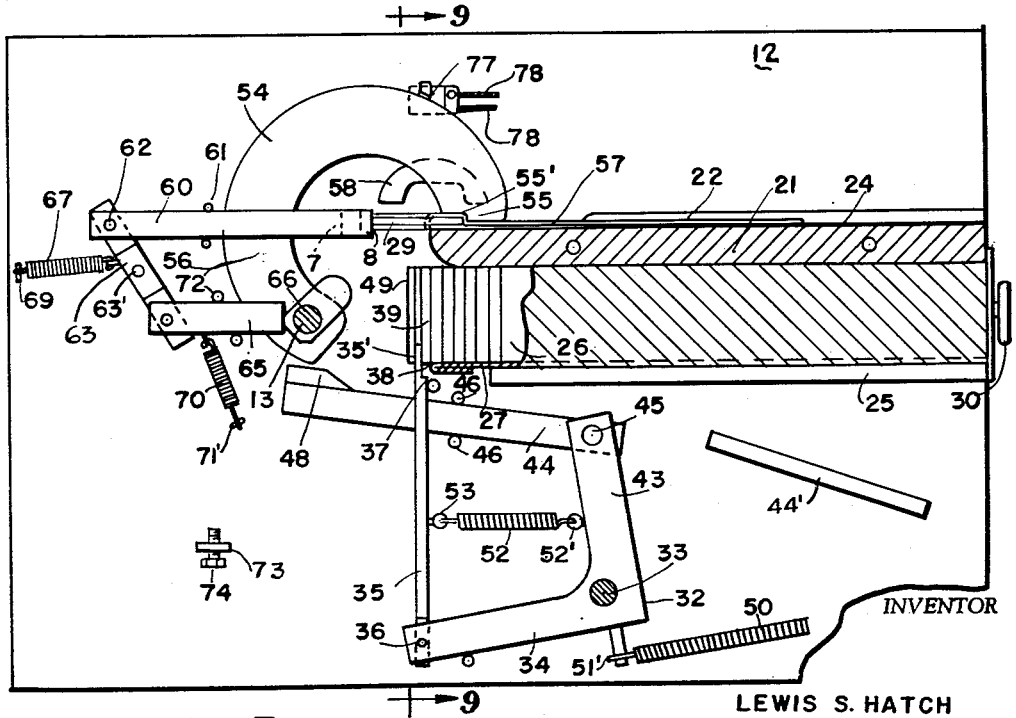
FIGURE 7 is a view similar to FIGURE 3, but showing the hammer and its associated parts engaging the buckle and the strap so as to secure the strap to the buckle.

The vertical arm 43 of the bell crank 32 is pivotally connected at one end to a longitudinally extending push rod 44 as at 45. Vertically spaced guide pins or rollers 46 (FIG. 7) which extend inwardly from at least one of the side walls 11 or 12 may be provided for supporting and guiding the push rod 44 when actuated by the bell crank 32. The free end of the rod 44 may be formed with an enlarged shoulder portion 48, so as to increase the height thereof (FIG. 7). A coil spring 50 is connected at one end as at 51 to the inner wall 11 and at its opposite end as at 51' to the bell crank 32 for normally urging the arm 34 and the buckle feeding arm 35 downwardly (FIG. 7). An auxiliary spring 52 may be connected as at 52' to the arm 43 of the bell crank and at 53 to the inner side of the rod 35, so as to coact with the spring 50 to assist in urging the push rod 35 to its lowermost position.

To the transverse rocker shaft 13 between the vertical side walls 11 and 12, is keyed or non-rotatively secured one end of a clamping member preferably in the form of a curved or segmental shaped hammer 54. The opposite end of the hammer 54 is preferably formed with a transversely disposed offset end portion or pressing head 55. Adjacent the shaft 13, the hammer 54 has extending laterally from one side thereof a pin or lug 56 (FIG. 3) arranged to abut the inner end of the push rod 44 and its shoulder portion 48 at predetermined intervals during the operation of the machine and when the hammer 54 is rotated to its lowermost position. Thus, the hammer serves to provide means for actuating the bell crank 32 so as to raise the arm 34 thereof, in order simultaneously to raise the buckle feed arm 35 and move the shoulder portion 37 into engagement with the bottom of the adjacent buckle 39. Continued upward movement of the feed arm 35 raises the buckle carried thereby to the position, shown in FIGURE 3, so that the eyelet or transverse opening 40 in the buckle, will be positioned above the top of the anvil 21 and be located between the guide ribs 22, so that the straight free end portion 57 of the tie strap 24 may be passed through the eyelet 40 and be engaged by the head 55 so as to be folded over the buckle 27 and in overlapping engagement with the main portion or body of the strap 24. It will be noted that the offset shape of the head 55 provides a reduced transverse surface 55' that engages the portion of the strap that overlaps the buckle and a portion that engages the folded end portion 57 of the strap (FIG. 7).

The hammer 54, as well as its associated parts, may be connected to the inner side of the wall 12 (FIG. 7). Also connected to this wall and spaced above the anvil 22 and the opening 38 in the drawer 26, is a buckle guide member 58 having a curved inner wall 59 which coacts with a similarly shaped guide member 58 on the inner side of the adjacent wall 11 for guiding the upper end of the buckle carried by the feed arm 35, so as to direct the movement of the buckle from its vertical position to its horizontal position on the anvil 21 as the hammer 54 engages the underside of the end portion 57 of the strap after the same has passed through the eyelet 40 and is folded into overlapping engagement with the main portion of the strap.

Figure 8:
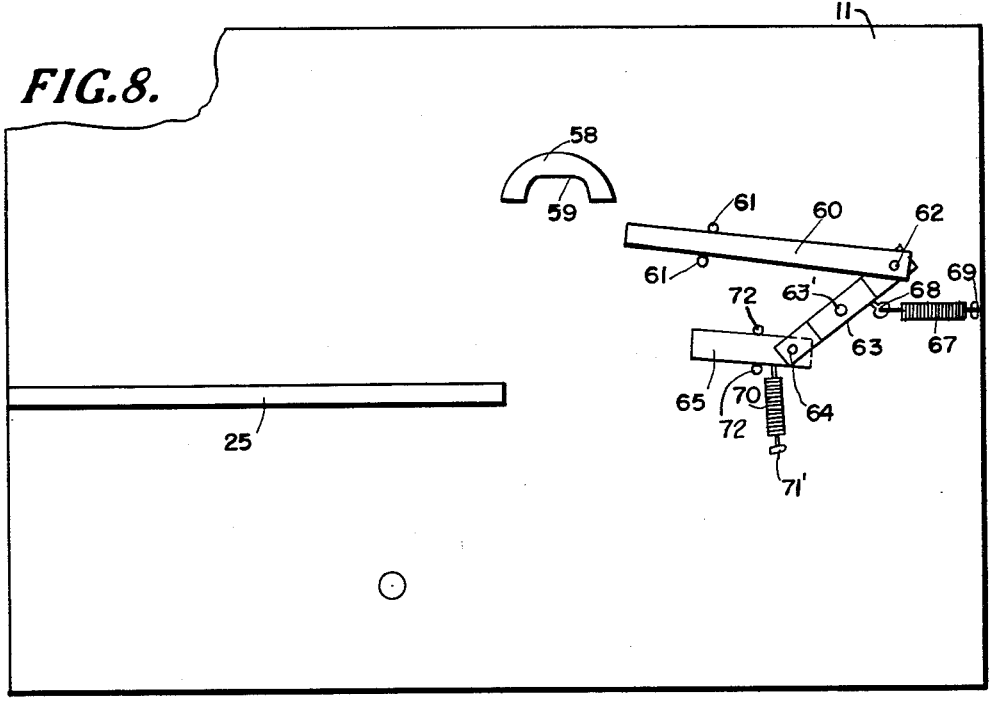
FIGURE 8 is an elevational view of the other inside wall of the machine showing the parts that may be connected thereto.

Also on the inner side of the wall 11 there may be carried a longitudinally disposed reciprocating tie ejecting bar 60 that extends loosely between vertically spaced guide pins or rollers 61 (FIG. 8) extending inwardly from the wall 11. The outer end of the ejecting bar 60 is pivoted as at 62 to a depending link 63 which, in turn, is pivoted at 63' to a side wall and at 64 to an operating arm 65 that engages a cam member 66 fixed on the shaft 13. The ejecting bar 60 at its inner end is connected to a transversely disposed arm 7 (FIG. 4) to which is connected transversely spaced lugs 8 arranged to engage first the opposite sides of the buckle 27 (FIG. 12) and then the inner end of the buckle 27 (FIG. 7) when the latter is moved to the horizontal position on the anvil and after the buckle has been connected by the hammer 54 to the tie or strap 24.

The cam 66 is preferably shaped, as shown in FIGURE 3, so as to control the actuation of the ejector rod 60 upon rotation of the shaft 13 and movement of the hammer 54. A spring 67 is connected at one end as at 68 to the link 63 and at its opposite end as at 69 to the inner side of the wall 12, so as normally to urge the rod 60 away from the anvil 21. A spring 70 is connected as at 71 to the arm 65 and at its opposite end to the inner side of the wall 11 as at 71'. Vertically spaced guide pins 72 may be provided on at least one of the side walls 11 or 12 for controlling the longitudinal movement of the arm 65 during the operation of the machine.

An internally threaded lug 73 extends inwardly from the inner side of one of the walls, such as the wall 12, and is positioned below the hammer 54 and is connected to an adjustable threaded bolt 74 for the purpose of providing a stop for limiting the downward movement of the hammer 54 when the latter is in its lowermost or inoperative position (FIG. 3). A microswitch or the like 75 (FIG. 5) is positioned adjacent the rear of the machine so as to be in the path of movement of the tie or strap 24, when the latter is fed into the machine between the guide ribs 22. The microswitch 75 is electrically connected by the wires 76 to the reversible motor 19 (FIG. 1, so as to impart rotation to the shaft 18 in a clockwise direction. A spaced microswitch or the like 77 (FIG. 3) is also connected to the inner wall of the machine and is arranged to be engaged by the hammer 54 (FIG. 7) when the latter is rotated to its operative or clamping position. The switch 77 is electrically connected by the wires 78 to the motor 19, so as to rotate the shaft 18 thereof in an opposite or counterclockwise direction. Thus, the various parts of the machine are automatically time controlled so that, when the machine is in operation, a buckle 27 is fed from the drawer 26 to a vertical position, above the anvil after the strap 24 is passed through the eyelet of the buckle, into the path of movement of the hammer 54. The hammer as it is raised from its lower most inoperative position, folds and presses the end portion 57 on the strap 24 so as to securely connect the buckle thereto. During the folding movement of the end portion 57 of the strap, the upper end of the buckle 39 is guided by the spaced guides 58 so as to facilitate the movement of the end portion 57 to its overlapped position. The strap and attached buckle are then ejected and cleared from the path of the next buckle to a position where it can be manually removed from the machine while another buckle is being automatically fed to receive a strap without in any way interfering with the operation of the machine.

It will be manifest that any suitable means may be provided for automatically controlling the rocking of the shaft 18 in a controlled cycle, so as to insure the synchronous operation of the shaft 13 and its associated parts to move the hammer 54 from its inoperative to its operative position and the feeding arm so as to sequentially raise the innermost buckle 39 in the drawer 26, to its raised position so that a tie bale or strap may readily be inserted through the eye buckle, and the free end portion of the strap folded over the main portion thereof by the hammer 54 so that the overlapped portion of the strap forms a hinge for the buckle. It will be seen that, when the hammer 54 is rotated to release the pin 56 from engagement with the end of the push rod 44 (FIG. 7), the tension of the spring 50 will actuate the bell crank 32 to move the feeler arm 35 downwardly so that the shoulder 37 thereof is beneath the innermost buckle 39 and the upper reduced portion 35' projects into the opening 38 between the buckle 39 and the end 49 of the drawer (FIG. 7). The inner end of the ejector bar 60 is sufficiently spaced apart from the adjacent end of the anvil 21 when moved therefrom, so as to allow the free swinging movement of the buckle from its vertical position adjacent the side of the anvil to its horizontal flat position on the top of the anvil during the operation of the machine. Additionally, the guide ribs 42 on each of the buckles 27 engage the adjacent inner wall of the closed drawer, when the buckle reaches its innermost position and is being raised by the arm 35 to its elevated position.

Figure 10:
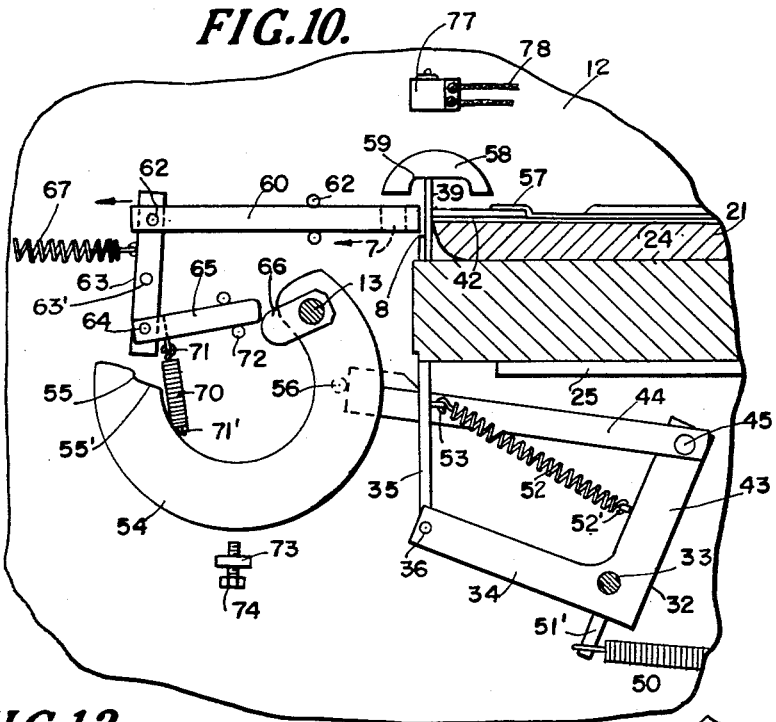
FIGURE 10 is a view similar to FIGURE 3, but showing the ejector member being moved to withdraw the strap and connected buckle from the machine.
Figure 12:
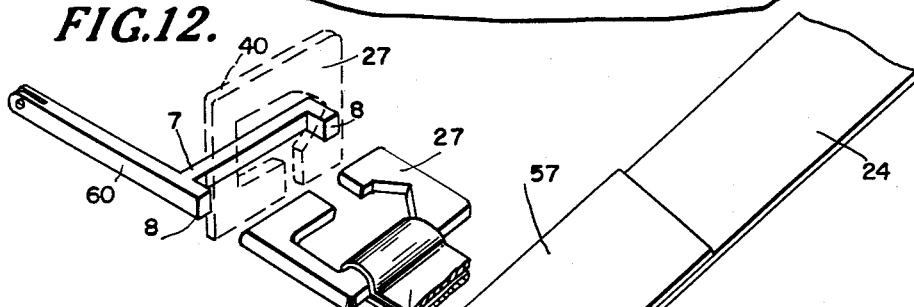
FIGURE 12 is an enlarged detail perspective view of the parts shown in FIGURE 10.

It will be noted that, when the parts are in the position shown in FIGURE 10, the buckle 27 which has just been attached to the strap 24 rests on the anvil while the buckle 39 which has been raised by the arm 35 engages the curved surfaces 59 of the guides 58, without interfering with the operation of the ejecting bar 60 and the cross arm 7 (FIG. 12). As soon as the lugs 8 on the bar 60 push the buckle and its connected strap away from the hammer out of the path of the next buckle to a position where the folded strap and connected buckle may be manually removed from the machine, the tension of the spring 70 and the loose connection of the link 63 with arm 65, as well as the particular shape of the cam 66 imparts a slight kick-back movement to the bar 60 which allows said next buckle to be subsequently raised by the arm 35 to its strap engaging position.

Operation

Figure 5:
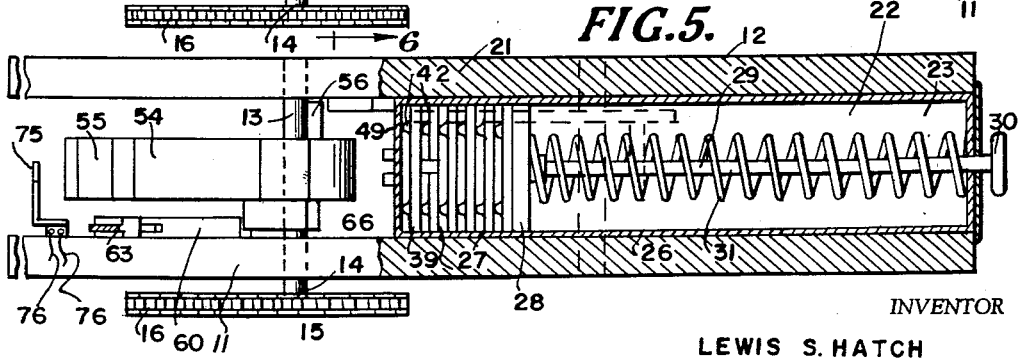
FIGURE 5 is a detailed horizontal sectional view showing the construction of the drawer for carrying the tie buckles.

During each cycle of operation, the machine automatically and synchronously withdraws a single buckle 27 from the drawer 26, so that the eye of the buckle is positioned above the anvil in order to receive the end portion of the strap 24 to which it is to be connected (FIG. 10). Assuming that drawer 26 has been emptied of the buckles 27, the drawer is withdrawn from the machine and a new supply of buckles are inserted and urged inwardly by the tension of the spring 31 (FIG. 5). Since there is no longer a buckle, such as 39, positioned above the anvil for receiving the strap 24, a strap 24 is inserted in the machine on the anvil 21 between the guide 22 so as to engage the switch 75 and cause rotation of the rock shaft 13 and the presser member or hammer 54, which are now in the position, as shown in FIGURE 10 the hammer 54 thereby bending the strap 24. When the hammer 54 is raised above the anvil and engages the switch 77, the motor shaft 18 is reversed so as to cause the hammer 54 to be returned to its inoperative position.

The tie ejecting bar 60 is then operatively actuated through the rotation of the shaft 16 and movement of the hammer 54 so that the completed tie and strap is moved out of the forming position. During this previously noted return movement, the pin 56 abuts against the adjacent end of the push rod 47 (FIG. 10), so as to raise the feeder arm 35 to engage the underside of the innermost buckle 39 and position the same above the anvil and into engagement with the underside of the spaced guides 58 connected to the inner sides of the walls 11 and 12, respectively.

Figure 11:
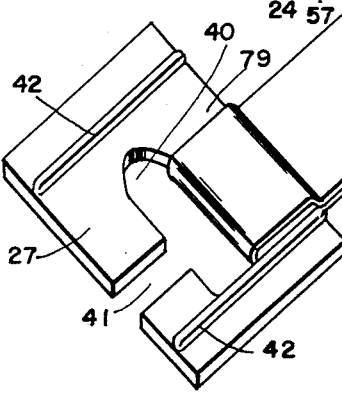
FIGURE 11 is a perspective view of the tie or strap connected to the buckle in accordance with the present invention.

This tie or strap is then retracted or withdrawn from the machine and the motor 19 stopped. The new strap or tie to which the buckle 27 is to be attached, is then moved over the top of the anvil 21 between the guides 22 and through the eye of the buckle 27, so as to contact with the microswitch 75 which will start a regular cycle of operation of the machine. During this operation, the hammer 54 which now has assumed an inoperative position (FIG. 3) is swung in a clockwise direction by rotation of the shaft 13, so that the free end portion 57 of the tie or strap 24 which has passed through the eye of the buckle is engaged by the head of the hammer 54 so as to be bent over the arm 79 of the buckle (FIG. 11) and be clamped or creased downwardly in overlapping engagement with the main portion of the tie 24 so as to assume the position, as shown in FIGURE 11. Thus, means are provided for insuring the secure connection of the buckle 27 to the tie 24. In this regard, the strap 24 maintains the buckle 27 in raised position during actuation of the hammer 54. It will be noted that as buckle 39 is raised by the rod 35, it abuts the inner curved walls 59 of the guides 58 so as to be swung by the folding portion 57 of the strap from its vertical position downwardly with the short end portion 57 of the tie 24, and rests on the top of the anvil 21. Said buckle 39 is raised from the drawer 26 and positioned above the anvil, without interfering with the operation of the ejecting bar 60 (FIG. 10). When the head 55 of the hammer 54 completes its clamping operation (FIG. 7), at the same time it contacts the microswitch 77 which is electrically connected to the reversing motor 19 through the wires 78, thus causing the shaft 13 and the hammer 54 to rotate in a counterclockwise direction to return the hammer to its inoperative position below the anvil 21 (FIG. 10). During this return movement, the cam 66 on the shaft 13 is moved so as to engage the end of the push rod or link 65 which, in turn, actuates the link 63 connected to the ejector rod 60 so that lugs 8 strike the adjacent flat or horizontal ends of the buckle 39 connected to the strap 24, in order to clear the path of the next buckle and move the finished bale tie to a position where it may be manually removed from the machine. At the same time, the downward movement of the hammer 54 causes the pin 56 thereon to engage the end of the push rod 44 that previously has been removed by tension of the springs 50 and 52 so as to position the shoulder 37 of rod 35 (FIG. 7) below the inner buckle 39. As the rod 35 is raised, it engages the underside of the buckle 39 so as to present the same in proper aligned position for receiving the next tie. Thus, it will be seen that a buckle applying machine for ties or bale straps is provided in which the parts are so synchronized as to insure the continuous and efficient operation of the machine through a single complete cycle at a minimum expenditure of time, effort, and cost. Moreover, the oscillation movement of the rock shaft 13 provides a common means for automatically controlling the feeding of the buckle to a position to receive the strap and for clamping the buckle to the strap as well as ejecting the buckle and connected strap out of the path of the next buckle to a position where the connected buckle and folded strap may be manually removed from the machine. Also, means are provided for introducing a new buckle to its strap applying position as the connected strap and buckle are removed from the machine.

In the modified forms of the invention shown in FIGURES 13, 14, 15, and 16, the return switch 77 and its associated parts have been removed and the shaft 13 is rotated clockwise by a motor 19', belt 16 and pulley 15 to move the hammer 54 from its inoperative position to its operative position (FIG. 15). Rotation of the shaft 13 in the opposite direction is effected by a coil spring 80 so as to return the hammer to its inoperative position (FIG. 14). The coil spring 80, is fixed at one end as at 81 to one of the walls, such as 12 and at its opposite end to the endless chain 16 as at 82. Thus it will be seen when the chain or belt 16 is moved in the direction of the arrow 83 (FIGURE 13), a predetermined distance by the one way motor 19', the spring 80, due to its connection with the chain 16 is distended and when the motor 19' is cut off, the shaft 18 is rotated in the opposite direction, due to the contraction of the spring 80, causes the endless chain or belt 16 to slip on the shaft 18 and the pulley 15 and the chain 16 to be returned to their initial position. The expansion and contraction of the spring 80 thus controls the position of the hammer 54 either in its operative position above the anvil or to its inoperative position below the same during the operation of the machine. The one-way motor 19 may be controlled by a manually operable switch such as 77 previously described and conveniently mounted to one side of the machine in order to start the motor 19' and move the hammer 54 to its operative position and in contact with the top of the anvil 21. Upon releasing the switch, the motor 19' stops and the spring 80 returns the hammer 54 to its inoperative or down position for reloading and positioning another buckle to be fastened to the end portion of a strap 24 in the manner as previously described. This operation takes very little time and can be performed in one or two seconds.

In order to insure each of the buckles 27 as it is fed from the receptacle or drawer 26 to its vertical position between the anvil 21 and the cross arm 7 of the ejecting bar 60 being maintained in proper position, an auxiliary guide member 84 is provided (FIGURE 16). This member includes a transversely disposed rod or bar 85 having its end portions 86 arranged to fit into transversely aligned bearing recesses 87 formed in the confronting inner sides of the walls 11 and 12. The bar 85 has extending upwardly therefrom a pair of parallel fixed arms 88 which are spaced from the ends of the bar 85 and of such a length as to engage the cross arm 7 of the ejecting bar 60, so as to be moved in a clockwise direction by the movement of the bar 60. A depending lever 89 extends from the bar 85 at a point adjacent one end thereof, and is connected at one end as at 90 to a coil spring 91. The opposite end of the spring 91 is fixed as at 92 to an adjacent side wall such as 12. The rod 85 between the parallel arms 88 may be provided with a centrally disposed flat bracing lug or projection 93.

An elongated spring finger 94 has a lower offset end portion 95 (FIG. 15) which is connected in any suitable manner, such as by the pin 96, to the lower end portion of the buckle feeding arm 35. The upper end of the spring finger 94 is free so as to provide yieldable means moveable with the feeding arm 35 and in releasable engagement with the outer surface of the flat lug 93 on the rod 85, so that when a buckle such as 39 (FIG. 14) is ejected from the receptacle or drawer 26 by the arm 35, the upward movement of the arm 35 simultaneously causes the raising of the spring finger 94, which in turn bears against the lug 93 so as to move the auxiliary guide member 84 from its open position, as shown in FIGURE 15, to its closed position against the upper portion of the arm 35. It will be seen upon retraction of the hammer 54 to its inoperative position (FIG. 14), that the spring 91 through its connection with the lever 89 will cause the parallel arms 88 to be moved away from the buckle to engagement with the cross bar 7 (FIG. 16). The auxiliary guide member 84 co-acts with the fixed curved guides 58 to not only insure the proper alignment of the buckle opening with the strap, but also the guiding of the buckle to its horizontal or flat position on the anvil 21, as the buckle and the strap are being moved by the hammer 54 to the clamping position. In other words, when the parts are in operative position, as shown in FIGURE 15, guide bar 84 is retained in an inclined position by the tension of spring 91. On the other hand, when the parts are returned to inoperative position, as shown in FIGURE 14, the auxiliary guide bar 84 is moved to a vertical guide position by the movement of spring arm 88 against lug 93 when feeding arm 35 is raised to an elevated position upon movement of hammer 54 to inoperative position whereupon guide bar 84 resiliently engages an adjacent buckle 39. Thus, the spring 80 may be readily substituted for the switch 77 for returning the hammer 54 and its associated parts from their operative position to their inoperative position.

It will be understood that the forms of the invention shown are merely illustrative and that such changes may be made as come within the scope of the following claims.

I claim:

1. A machine for applying an eyelet buckle to a bale strap comprising: a frame member, a longitudinally disposed strap support mounted on said frame member, an anvil head portion having an inner end formed adjacent one end of said support for slidably receiving and engaging a portion of a bale strap, a buckle receptacle positioned beneath said support having an outlet located adjacent said anvil head portion, a buckle guideway extending transversely between said receptacle outlet and said anvil head portion, feeding means movable within said guideway for raising an eyelet buckle from a lower position adjacent said receptacle outlet to a raised strap receiving position adjacent said anvil head portion, strap folding means including a curved hammer member rotatably mounted on said frame for movement between a remote position below said support to a loop-forming position adjacent the upper surface of said anvil head portion, means for operating said feeding means to raise a buckle to said strap receiving position in order to manually move a portion of said bale strap through the buckle eyelet, said operating means rotating said strap folding means to loop-forming position after said buckle has been raised to strap receiving position and then returning said means to said remote position for withdrawing said feeding means to lower position, and guide means on the machine above the inner end of the anvil which the buckle engages so as to be moved from its raised position to a substantially horizontal position on the anvil as said portion is folded by the hammer.

2. A machine for applying an eyelet buckle to a bale strap as defined in claim 1 additionally including means operably connected to said strap folding means for ejecting the folded strap and connected buckle from the path of the next buckle.

3. A buckle applying machine for bale straps including in combination spaced side walls, a longitudinally extending anvil projecting inwardly from one end of the machine and having its inner end spaced from the other end of the machine, a rocking shaft rotatably mounted between said walls and spaced from the inner end of the anvil and below the same, a curved hammer connected to said shaft so as to be pivoted thereby from an inoperative position below the anvil to an operative position above the anvil so as to engage an end portion of a strap to be connected to the buckle, means for rotating the rocking shaft in one direction, means for rotating the rock shaft in an opposite direction, a buckle receptacle supported in the machine below the anvil, buckle feeding means actuated by a first cam means movable with said hammer and releasably engaging with a buckle in said receptacle for raising the buckle vertically to a strap engaging position adjacent the inner end of the anvil so as to receive an end portion of the strap threaded through the eyelet of the buckle when slid inwardly along said anvil, means when the buckle is moved to its strap engaging position and after being threaded on said strap for pivoting the hammer from its inoperative to its operative position so as to engage said end portion of the strap and fold the same over the buckle and into overlapping engagement with an adjacent portion of said strap on the anvil, and guide means on the machine above the inner end of the anvil which the buckle engages so as to be moved from its vertical position to a substantially horizontal position on the anvil as said end portion is folded by the hammer.

4. A buckle applying machine, as called for in claim 3, which includes a reciprocating bar engageable with the buckle after said buckle has been moved to horizontal position on the anvil, and second cam means actuating said bar to shift the buckle and folded strap along said anvil to clear the path of the next buckle, as said hammer is being pivoted from its operative to its inoperative position.

References Cited in the file of this patent

UNITED STATES PATENTS

| | | |
|---|---|---|
| 65,856 | Adams | June 18, 1867 |
| 573,537 | Reid | Dec. 22, 1896 |
| 688,022 | Laidlaw | Dec. 3, 1901 |
| 1,128,517 | Rogers | Feb. 16, 1915 |
| 2,489,377 | Hendrixson | Nov. 29, 1949 |
| 2,599,283 | Price | June 3, 1952 |
| 2,612,203 | Smida | Sept. 30, 1952 |
| 2,627,889 | Morrison | Feb. 10, 1953 |